(12) United States Patent
Kohlhoff

(10) Patent No.: US 8,401,687 B2
(45) Date of Patent: Mar. 19, 2013

(54) VISUAL ASSEMBLY TOOL

(75) Inventor: Stephan Kohlhoff, Wiesbaden (DE)

(73) Assignee: SAP AG, Walldorf (DE)

( * ) Notice: Subject to any disclaimer, the term of this patent is extended or adjusted under 35 U.S.C. 154(b) by 351 days.

(21) Appl. No.: 12/953,900

(22) Filed: Nov. 24, 2010

(65) Prior Publication Data

US 2012/0130521 A1    May 24, 2012

(51) Int. Cl.
*G06F 19/00* (2011.01)
*G06F 3/048* (2006.01)

(52) U.S. Cl. .................. 700/98; 700/105; 715/771

(58) Field of Classification Search .............. 700/95–98, 700/105–107; 703/1, 2; 715/700, 764, 769, 715/771; 345/418–420
See application file for complete search history.

(56) References Cited

U.S. PATENT DOCUMENTS

| 6,104,403 | A  | * | 8/2000  | Mukouchi et al. ............ 345/419 |
| 6,826,500 | B2 | * | 11/2004 | Linthicum et al. ............ 702/98  |
| 2003/0097195 | A1 | * | 5/2003  | Yamrom et al. ................ 700/95  |

FOREIGN PATENT DOCUMENTS

JP    2002355724 A  * 12/2002

OTHER PUBLICATIONS

Extended European Search Report issued in European Application No. 11006768.3 on Dec. 19, 2011; 6 pages.

Huang, Kai-I; "Development of an Assembly Planner Using Decomposition Approach"; Proceedings of the International Conference on Robotics and Automation; vol. Conf. 10; May 2, 1993; 6 pages.
Kanai et al.; "ASPEN: Computer-Aided Assembly Sequence Planning and Evaluation System Based on Predetermined Time Standard"; Annals of the CIRP, vol. 45; Jan. 1996; 6 pages.
Mo, Jianzhong et al.; "Virtual Disassembly"; International Journal of CAD/CAM, vol. 2, No. 1; 2002; pp. 29-37.
Weule, H. et al.; "Computer-Aided Product Analysis in Assembly-Planning"; Annals of the CIRP, vol. 38; 1989; 4 pages.

* cited by examiner

*Primary Examiner* — Crystal J Barnes-Bullock
(74) *Attorney, Agent, or Firm* — Fish & Richardson P.C.

(57) ABSTRACT

An assembly model is identified including a plurality of part models. Each part model is a predefined, selectable model corresponding to at least one part in a plurality of assembly parts. The assembly model is presented and a sequence of user selections identifying part models in the assembly model are received through a user interface. User selections can correspond to designations of parts to be removed from the modeled assembly during a disassembly of the assembly. Selected part models are removed from the displayed presentation in response to corresponding user selections. A disassembly order is generated including an ordered grouping of disassembly steps, each disassembly step corresponding to a user selection of a part model in the sequence of user selections. The disassembly steps are ordered based on an order of selection of the corresponding part models. The order of the disassembly order is reversed and an assembly order is generated for the assembly from the reversed disassembly order.

21 Claims, 13 Drawing Sheets

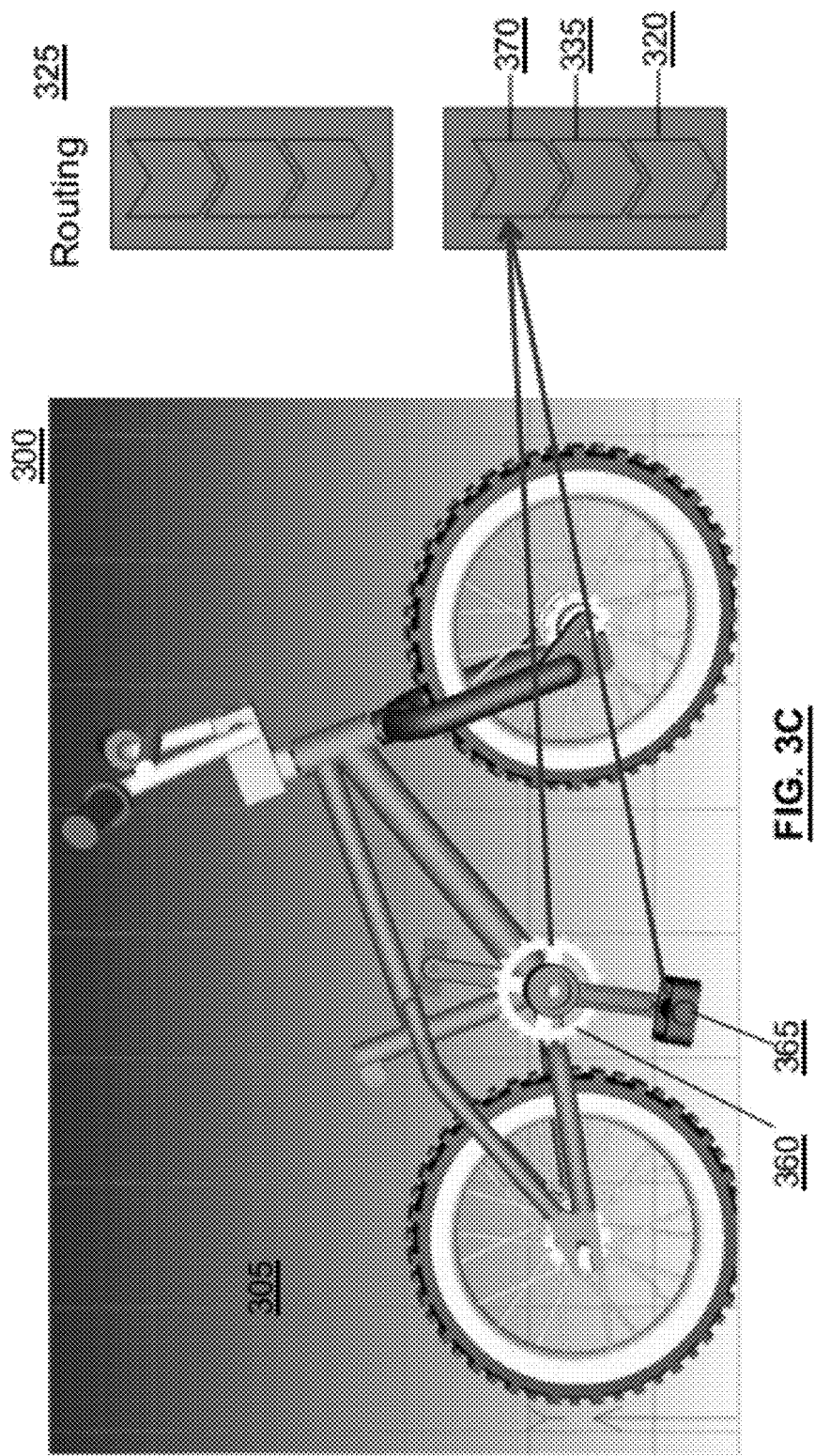

VISUAL ASSEMBLY TOOL

TECHNICAL FIELD

This disclosure relates generally to graphic viewing computer applications, and more particularly to graphical viewing application adapted for use in connection with product manufacturing.

BACKGROUND

For a complex assembly it is often necessary to define the sequence of assembly before an order is submitted to the shop floor to avoid quality problems associated with the wrong assembly sequence. Typically, determining the correct sequence of assembly requires that manufacturing or process engineers select one or more of multiple different options. First, a physical prototype can be developed and constructed upon which an assembly sequence can be developed, for example, through a process of trial and error. Physical prototypes can require manufacturing prototypes for each of the parts that are to be included in the product modeled by the physical prototype. Development of physical prototypes is sometimes not possible and can be prohibitively expensive, such as in instances where the product and parts are in an early stage of development. Second, digital mock-up (DMU) systems have been developed and can be used. Typically, a DMU is a specialized, complex software system, adapted for use by trained design engineers, that can, in some instances, be integrated as features within a full computer aided design (CAD) system.

SUMMARY

This disclosure provides various embodiments for generating manufacturing instructions using an interactive part model viewer. A model of an assembly can be identified that includes a plurality of distinct part models. Each part model in the plurality of part models can be a predefined, selectable part model corresponding to at least one part in a plurality of parts making up the assembly. The model of the assembly can be presented in a user interface of a viewer application. A sequence of user selections identifying particular part models in the plurality of part models can be received through the user interface. User selection of a particular part model can correspond to a designation of a corresponding part in the plurality of parts for removal from the assembly during a disassembly of the assembly. Each selected part model can be removed from the displayed presentation in response to a corresponding user selection. A disassembly order can be generated that includes an ordered grouping of disassembly steps, each disassembly step in the grouping of disassembly steps corresponding to a user selection in the sequence of user selections, the grouping of disassembly steps ordered based on an order of selection of the corresponding part models by a user. The order of the disassembly order can be reversed and the reversed disassembly order used to generate an assembly order for the assembly.

While generally described as computer implemented software that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIGS. 3A-3G illustrate an example viewing and modeling of a product assembly using an interactive viewer tool.

Like reference symbols in the various drawings indicate like elements.

DETAILED DESCRIPTION

This disclosure generally describes software, computer-implemented methods, and systems relating to visualizing product assemblies and modeling the assembly and disassembly of a modeled product using a simplified viewer tool. Implementations of the viewer tool described herein can be adapted to present a model of a product to a user and allow the user to select individual parts comprising the product. Selecting one or more product parts can serve to designate a sequence for the part-by-part disassembly of the product. After a disassembly sequence has been specified by a user, the disassembly sequence can be reversed to develop an assembly sequence for the same product. Additionally, this functionality can allow a user to describe operations, tools, and other features associated with assembly steps for various parts in the product, including data provided or maintained by an enterprise resource planning (ERP) system. Further, an assembly sequence generated using the viewer, together with part master data, can be used to create detailed routing and manufacturing bills of material for use within the manufacturing domain. In short, the described viewer provides a simple, yet focused functionality set particularly well-adapted to developing an optimized assembly sequence for a particular product. While typical CAD and DMU systems can model certain aspects of a product's assembly, these systems are typically adapted for use within the design, rather than the manufacturing or process domain. Further, given their specialized nature and broad design domain functionality, typical CAD and DMU systems can be very expensive and require extensive training in order to make full use of the system's full feature set.

Figure 1A:
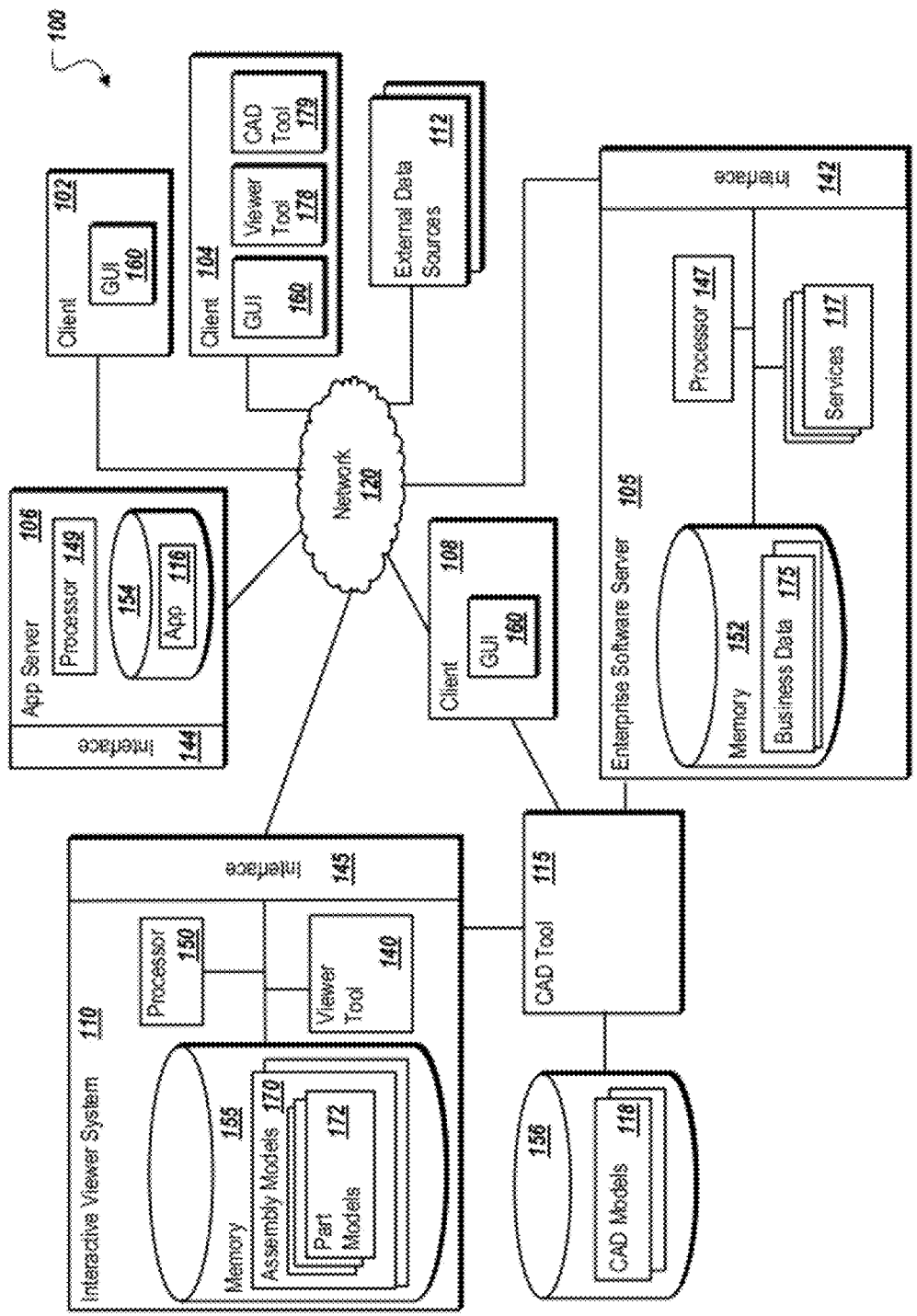
FIG. 1A illustrates an example computing system including an interactive viewer tool.

FIG. 1A illustrates an example computing system 100, such as a system used within an engineering and manufacturing environment. including an interactive viewer system 110. The interactive viewer system 110 can include an interactive viewer tool 140 adapted for use in modeling, simulating, and developing assembly sequences and instructions for use in product manufacturing. The interactive viewer tool 140 can make use of assembly models 170 corresponding to a manufacturing product assembly (or "product"), each assembly model 170 including a plurality of part models 172 modeling parts from which the product (and assembly model 170) can be comprised. In some examples, instances or portions of the interactive viewer tool (e.g., 178) can be installed locally on client computing devices (e.g., 104) and interface with the interactive viewer system 110. The computing system 100 can further include one or more enterprise resource planning (ERP) system servers 105, provided, for example, in connection with an ERP or other enterprise software environment, as well as a plurality of client computing devices 102, 104, 108. ERP system servers 105 can serve a plurality of software applications, modules, and services 117 accessing, modifying, managing, and operating on business data 175 maintained by the enterprise resource planning system, including data generated and used by the interactive viewer system 110. Additionally, in some instances, an example computing system 100 can further include a computer-aided design (CAD) system 115, 179, or tool adapted to develop three-dimensional CAD models (e.g., 118) of assemblies within the context of a part and product engineering (or "design") domain. The interactive viewer tool 140, as well as the CAD system (e.g., 115), can be integrated or otherwise provided in connection with an enterprise software environment including an enterprise resource planning system served by ERP system server 105.

One or more clients (e.g., 102, 104, 108) can access and interface with one or more of the ERP system server 105, interactive viewer system 110 (and/or interactive viewer 140), CAD system 115, as well as other applications and systems. Clients can include personal computing devices (e.g., 102, 104, 108), application servers (e.g., 106), mainframe computing devices, and other client devices making use of services and operations provided through one or more of the ERP system server 105, interactive viewer system 110, CAD system 115, or other systems. Clients can be local to one or more of the ERP system server 105, interactive viewer system 110, or CAD system 115, have locally installed instances of the interactive viewer (e.g., 178) or CAD system (e.g., 179), or access one or more of the ERP system server 105, interactive viewer system 110, and CAD system 115 remotely over one or more networks 120, such as a local area, private, enterprise, or public network, including the internet. Additionally, in some instances, servers (e.g., 105, 106, 110) can include one or more interfaces (e.g., 142, 144, 145) comprising logic encoded in software and/or hardware in a suitable combination and operable to communicate with a network 120, and other computing devices, including computing devices coupled to the network 120. More specifically, such interfaces can comprise software supporting one or more communication protocols associated with communications such that a network 120 or hardware is operable to communicate physical signals within and outside of the illustrated software environment 100.

As used in this document, the term "computing device" or "computer" is intended to encompass any suitable processing device. For example, a computing device can include one or more servers operable to receive, transmit, process, store, or manage data and information associated with the software environment 100. Additionally, computing devices implementing one or more of the ERP system server 105, interactive viewer system 110 (and/or interactive viewer 140), CAD system 115, as well as other applications and systems can be implemented as a distributed or cloud-based computing environment. Additionally, the environment 100 may be implemented using computers other than servers, including a server pool. Further, any, all, or some of the servers (including computing devices 102, 104, 105, 106, 108, 110, etc.) may be adapted to execute any operating system, including Linux, UNIX, Windows Server, or any other suitable operating system. Clients 102, 104, 108, as well as other users external to environment 100, can, directly or indirectly (e.g., via a proxy, virtual machine interface, etc.) access and perform operations, testing, and modeling using one or more of the ERP system server 105, interactive viewer system 110 (and/or interactive viewer tool 140), CAD system 115, as well as other applications and systems. It will be further understood that the term "application server" (e.g., 106) can include any suitable software component or module, or computing device (s) capable of hosting and/or serving a software application, including distributed, enterprise, or cloud-based software applications.

In some instances, computing devices, systems, processes, and applications in environment 100 can be hosted on a common computing system, server, or server pool, and share computing resources, including shared memory, processors, and interfaces with an enterprise software system or other software system. Computing devices in environment 100 can further interface with other software systems and client devices to communicate in a client-server or other distributed environment (including within environment 100).

Each of the example servers (e.g., 105, 106, 110) illustrated can include a processor (e.g., 147, 149, 150). Each processor can execute instructions and manipulate data to perform the operations of the associated server, and may comprise, for example, a central processing unit (CPU), a blade, an application specific integrated circuit (ASIC), or a field-programmable gate array (FPGA), among other suitable options. Processors can be implemented as one or more processors according to the particular needs of the associated server. References to a single processor can also be interpreted to include multiple processors where applicable. The operations that each processor executes can be determined by the purpose and operations of its associated server. Generally, the processor executes instructions and manipulates data to perform the operations of its respective server and, specifically, the software systems and applications (e.g., 116, 117, 140) hosted by the server.

At a high level, each "server" includes one or more electronic computing devices operable to receive, transmit, process, store, or manage data and information associated with the environment 100. Specifically, a server is responsible for receiving requests from one or more clients and sending the appropriate response to the requesting client. In addition to requests from external clients, requests may also be sent from internal users, external or third-party customers, other automated applications, as well as any other appropriate entities, individuals, systems, or computers. For example, although FIG. 1 illustrates single servers, a server can be implemented using one or more servers, as well as computers other than servers, including a server pool. Indeed, a server may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, a server can be adapted to execute any operating system, including Linux, UNIX, Windows, Mac OS, or any other suitable operating system.

In the case of a server implementing a particular application or service, including servers 105, 106, 110, the server processor can execute the functionality required to receive and respond to requests and interactions from client devices 102, 104, 108 as well as client applications 116 interfacing with service, such as interactive viewer tool 140. Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. Applications can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate.

At a high level, applications (e.g., 116, 117, 140) illustrated in the environment 100 can include any application, program, module, process, or other software that may execute, change, delete, generate, or otherwise manage information according to the present disclosure, particularly in response to and in connection with one or more requests received from the illustrated clients 102, 104, 108, as well as other applications. In certain cases, only one hosted application may be located at a particular server. In others, a plurality of related and/or unrelated hosted applications may be stored at a single server, or located across a plurality of other servers, as well. In certain cases, environment 100 may implement a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed by remote clients (e.g., 102, 104) or client applications 106 via the network 120 (e.g., through the Internet). Further, one or more processes associated with a particular hosted application may be stored, referenced, or executed remotely. For example, a portion of a particular hosted application may be a web service associated with the application that is remotely called, while another portion of the hosted application may be an interface object or agent bundled for processing at a remote client. Moreover, any or all of the hosted applications may be a child or sub-module of another software module or enterprise application (not illustrated) without departing from the scope of this disclosure. Still further, portions of the hosted application may be executed by a user working directly at server hosting the application or remotely at a client computing device.

Each of the example servers (e.g., 105, 106, 110) can also include a memory (e.g., 152, 154, 155). Other computing devices can include memory, such as client computing devices 102, 104, 108 and computing devices hosting or executing software systems including CAD system 115 (and associated memory 156) as well as other external data sources 112. Each memory may include any memory or database module and may take the form of volatile or non-volatile memory including, without limitation, non-transitory memory elements, magnetic media, optical media, random access memory (RAM), read-only memory (ROM), removable media, or any other suitable local or remote memory component. Each memory may store various processes, process components, models, objects or data, including classes, frameworks, applications, backup data, business objects, jobs, web pages, web page templates, database tables, content repositories storing business or other dynamic information, or other information including any parameters, variables, algorithms, instructions, rules, constraints, or references thereto relevant to the purposes of the particular server. Each memory may also include any other appropriate data, such as VPN applications, firmware logs and policies, firewall policies, a security or access log, print or other reporting files, as well as others. Again, the particular data and instructions stored in each memory will be described in detail below in connection with the illustrated implementations of the software environment 100 and components thereof.

Generally the network 120 facilitates wireless or wireline communications between the components of the software environment 100. The network 120 can be implemented as one or more distinct networks. In any implementation, the network 120 may be a continuous or discontinuous network without departing from the scope of this disclosure, so long as at least a portion of the network 120 may facilitate communications between senders and recipients. The network 120 may be all or a portion of an enterprise or secured network. In some instances, a portion of the network 120 can be a virtual private network (VPN). All or a portion of the network 120 can comprise either a wireline or wireless link. Example wireless links may include 802.11a/b/g/n, 802.20, WiMax, and/or any other appropriate wireless link. In other words, the network 120 encompasses any internal or external network, networks, sub-network, or combination thereof operable to facilitate communications between various computing components inside and outside the illustrated environment 100. The network 120 may communicate, for example, Internet Protocol (IP) packets, Frame Relay frames, Asynchronous Transfer Mode (ATM) cells, voice, video, data, and other suitable information between network addresses. The network 120 may also include one or more local area networks (LANs), radio access networks (RANs), metropolitan area networks (MANs), wide area networks (WANs), all or a portion of the Internet, and/or any other communication system or systems at one or more locations.

The illustrated implementation of FIG. 1A includes one or more local and/or remote client computing devices 102, 104, 108. Each client 102, 104, 108 can be a computing device operable to connect or communicate with one or more of the ERP system server 105, interactive viewer system 110, CAD system 115, as well as other applications and systems including network 120, using a wireline or wireless connection. Each client 102, 104, 108 can include a graphical user interface (GUI) 160. In general, each client 102, 104, 108 comprises an electronic computing device operable to receive, transmit, process, and store any appropriate data associated with the software environment of FIG. 1. It will be understood that there may be any number of clients 102, 104, 108 associated with environment 100, as well as any number of clients external to environment 100. Further, the term "client" and "user" may be used interchangeably as appropriate without departing from the scope of this disclosure. Moreover, while each client is described in terms of being used by one user, this disclosure contemplates that many users may use one computer or that one user may use multiple computers. As used in this disclosure, the client is intended to encompass a personal computer, touch screen terminal, workstation, network computer, kiosk, wireless data port, smart phone, personal data assistant (PDA), one or more processors within these or other devices, or any other suitable processing device. For example, a client (e.g., 102, 104, 108) may comprise a computer that includes an input device, such as a keypad, touch screen, mouse, or other device that can accept information, and an output device that conveys information associated with operations of the applications and services provided through system 100, including ERP system services and interactive viewer tool 140. Indeed, in some instances, at least a portion of services and applications consumed by clients 102, 104, 108 can be hosted on the client device itself, including CAD system 115 and interactive viewer tool 140, as well as ERP system services. Both the input device and the output device may include fixed or removable storage media such as a magnetic computer disk, CD-ROM, or other suitable media to both receive input from and provide output to users of the clients through the display, namely the GUI.

A GUI 160 can comprise a graphical user interface operable to allow the user to interface with at least a portion of environment 100 for any suitable purpose, including allowing a user to interact with one or more software applications, including the interactive viewer 140. Generally, a GUI provides users with an efficient and user-friendly presentation of data provided by or communicated within the system. The term "graphical user interface," or GUI, may be used in the singular or in the plural to describe one or more graphical user interfaces and each of the displays of a particular graphical user interface. Therefore, the GUI can be any graphical user interface, such as a web browser, touch screen, or command line interface (CLI) that processes information in the environment 100 and efficiently presents the results to the user. In general, the GUI may include a plurality of user interface (UI) elements such as interactive fields, pull-down lists, media players, tables, graphics, virtual machine interfaces, buttons, etc. operable by the user at the client (e.g., 102, 104, 108). These UI elements may be particularly related to and adapted for the functions of the interactive viewer 140.

Figure 1B:
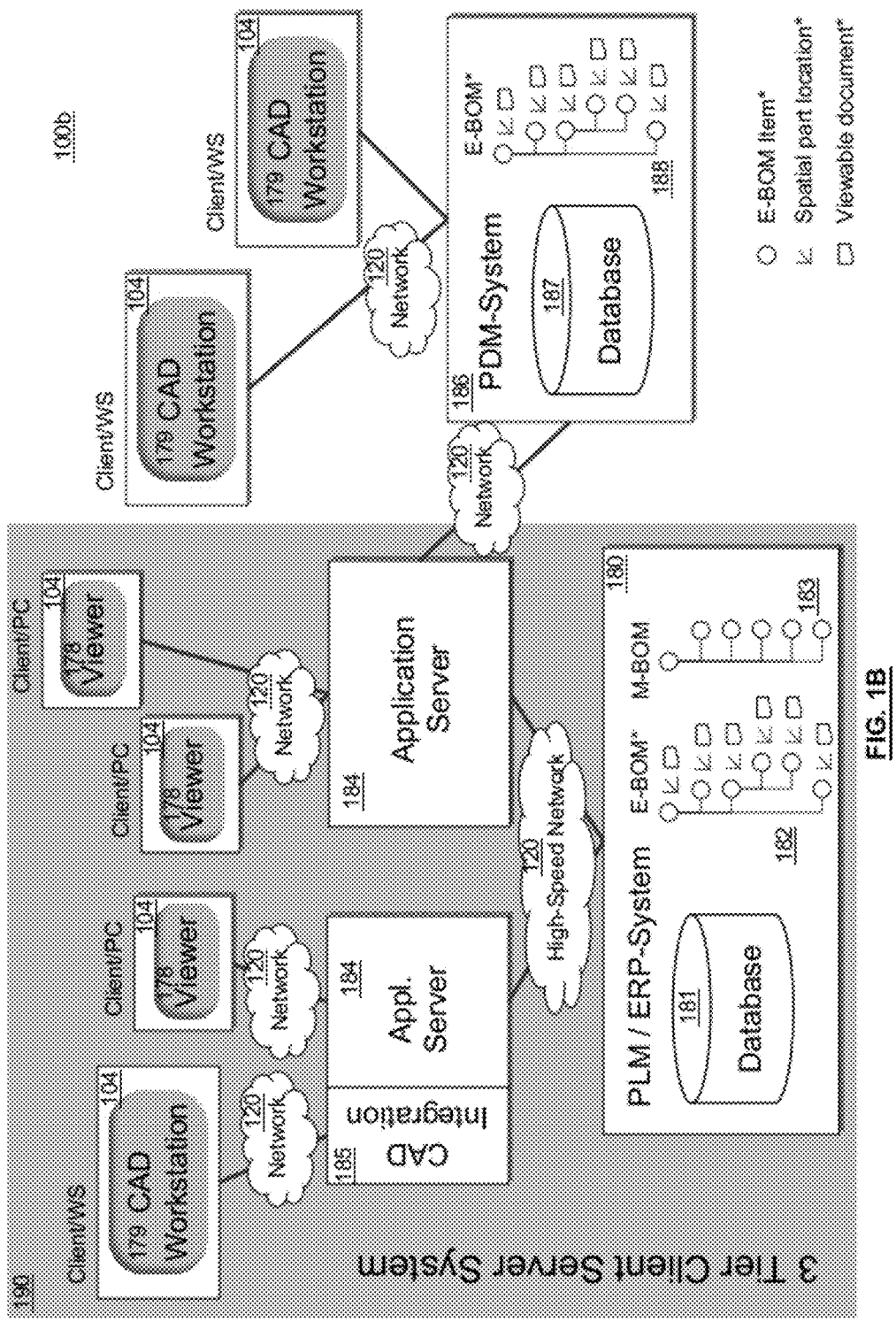
FIG. 1B illustrates a particular implementation of the example computing system of FIG. 1A.

FIG. 1B illustrates a particular implementation of the example computing system of FIG. 1A. A system 100b can be provided that permits two variant implementations of a particular, combined engineering-manufacturing environment. In one instance, a product lifecycle management (PLM) and/or enterprise resource planning (ERP) system 180 can be provided, in connection with a three-tier client-server environment 190, that stores engineering and manufacturing data in at least one database 181. The relevant data can include an engineering bill of material 182 that includes associated CAD data and viewing file documents attached together with the description of spatial location data defining each individual part in absolute or relative position to other parts in the model (e.g., relative to the part's superior part or element in an hierarchical bill of materials). Manufacturing master data can also be stored, including a manufacturing bill of materials 183. Further, the system 180 can be connected to one or more client-users via one or more application servers 184 serving computer programs, logic, and functionality used to execute one or more of the interactive viewer, CAD system, etc. Application server 184 and system 180 can be connected via a network 120, such as a high-speed network (e.g., a gigabit Ethernet system).

The application server 184 can connect or interface with a client 104 running a CAD design tool 179 via a CAD integration module 185. Application server 184 and the CAD workstation and other clients 104 can be connected via a network 120, such as a local area network (LAN). Design documents attached to or integrated with the engineering bill of materials 182 can not only include native CAD files, compatible with its respective CAD system 179, but also viewing files in a neutral format allowing for the design to be displayed and analyzed in 3D by a relatively simple viewer program 178. All or a portion of the viewing program 178 can be installed on user client computing devices 104. The viewer 178 can be adapted for use for non-design engineers like purchasers, project managers, business persons, and manufacturing or process engineers, interested primarily in the 3D graphical representation of the product and not the complex details and data behind the design process and CAD data. Indeed, generally, the viewer 178 can have a fraction of the functionality of the CAD system 179 and provide a simplified user environment to accommodate the needs of less technical users.

In a second implementation of the combined engineering manufacturing environment 100b, design data can be kept separate from the ERP/PLM system 180. Rather, design data 188 can be maintained in database 187 of a PDM (Product Data Management) system 186. Still, an engineering bill of materials 182 can be maintained in the ERP/PLM system 180 to provide access to all relevant engineering data for downstream processes like purchasing, prototype builds, manufacturing engineering, project management, sales and service. This engineering bill of material 182 can include documents other than the CAD native files, such as viewing files linked to spatial location data describing the location in space of each individual part represented by the viewing file. PDM system 186 and PLM/ERP system 180 can be connected by a network 120. In either variant implementation, the PLM/ERP system 180 can maintain all necessary data to conduct the visual assembly process design described herein.

While FIGS. 1A and 1B are described as containing or being associated with a plurality of elements, not all elements illustrated within environments 100a, 100b of FIGS. 1A and 1B may be utilized in each alternative implementation of the present disclosure. Additionally, one or more of the elements described herein may be located external to environment 100a, 100b, while in other instances, certain elements may be included within or as a portion of one or more of the other described elements, as well as other elements not described in the illustrated implementation. Further, certain elements illustrated in FIGS. 1A and 1B may be combined with other components, as well as used for alternative or additional purposes in addition to those purposes described herein.

Figure 2:
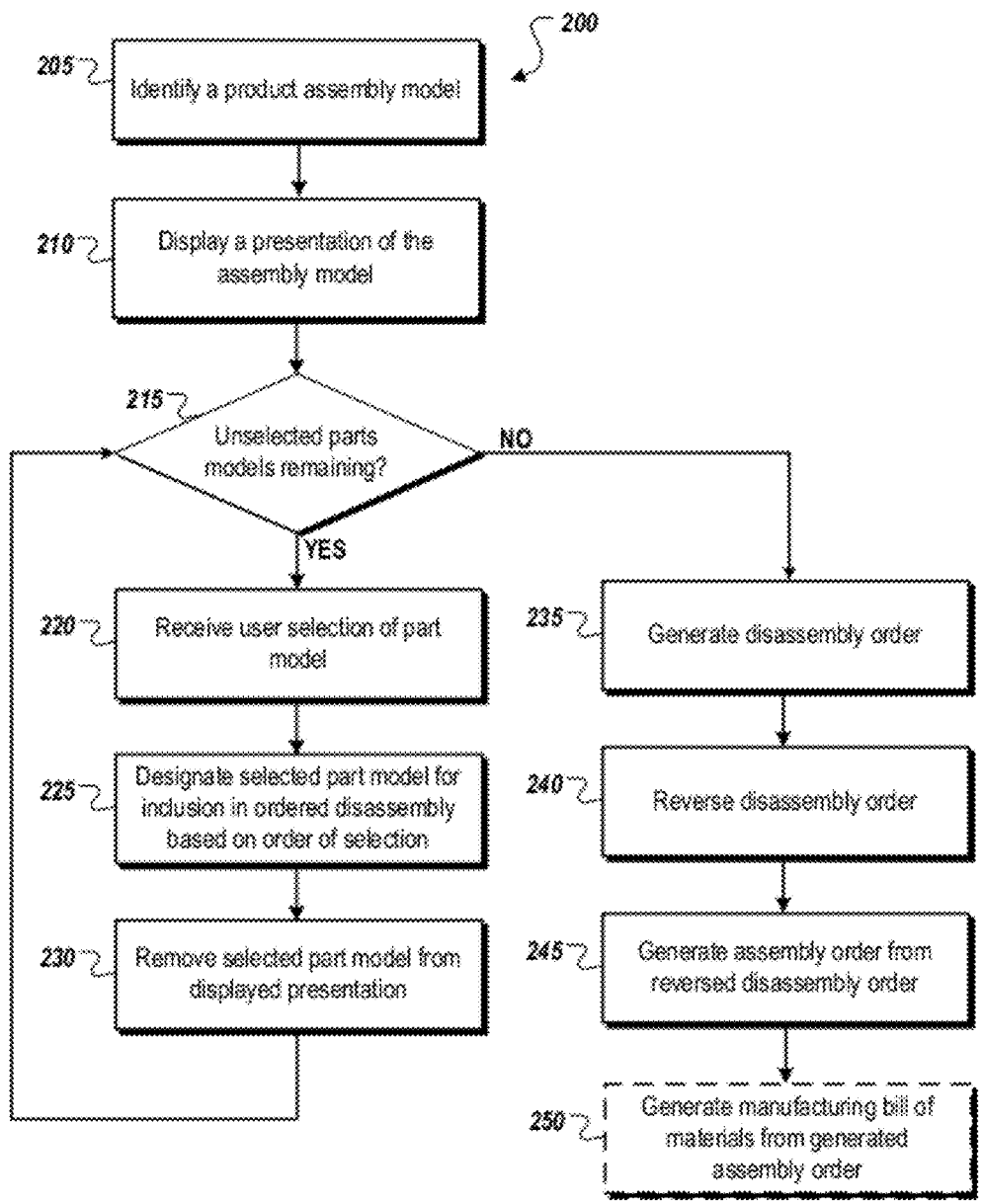
FIG. 2 is a flowchart of an example technique for dynamically generating a user interface.

Turning now to the flowchart 200 of FIG. 2, an example technique is shown for using an interactive viewer tool to generate a manufacturing assembly sequence for a product based on a modeled disassembly of the product. A model of the product, or "assembly model," can be identified 205. The modeled product can include, or be constructed from, a plurality of distinct parts. Indeed, the corresponding assembly model can itself include or be composed of a plurality of distinct part models, each part model representing a real-world part in the real-world assembly. Further, each part model in the plurality of part models can be a predefined, selectable part model corresponding to at least one part in the plurality of parts. A presentation of the modeled product or assembly can be displayed 210 in a user interface of a viewer application, such as an interactive viewer tool. In some instances the model can be a 3D model that can be analyzed by a user by zooming in, zooming out, sectioning, rotating the model, or selecting individual parts of the model. A sequence of user selections can be received through the user interface of the viewer application, each user selection identifying a particular part model in the plurality of part models. For instance, at decision block 215, if part models remain in the displayed presentation of the assembly model, a user selection of a remaining part model can be received 220. Each user selection of a particular part model can correspond to a designation 225 of a corresponding part in the plurality of parts to be removed from the product during a disassembly of the product according to a particular order corresponding to the sequence by which the part models are selected.

In some instances, selection of the part model can result in the part model disappearing or being removed 230 from the presentation of the assembly model. After removing a part model from the displayed assembly model, a modified presentation of the assembly model can be presented, representing a partially (or fully) disassembled product now missing the parts that have been selected and removed from the assembly model during the modeled disassembly of the product. In some instances, disassembly may be limited to a subset of the total set of parts included in the assembly, while in other instances disassembly can involve removal of all parts comprising the assembly. Accordingly, in instances where the modeled product assembly is to be entirely disassembled, no parts will be displayed in the user interface of the viewer upon selection (and removal) of the final part in the assembly (i.e., the final part(s) remaining when all other parts have been removed or disassembled from the product assembly). If, at decision block 215, it is determined that all parts have been removed, a disassembly order can then be generated 235 including an ordered grouping of disassembly steps, each disassembly step in the grouping of disassembly steps corresponding to a user selection in the sequence of user selections. Thus, the ordered grouping of disassembly steps can be ordered based on an order of selection of the corresponding part model by a user. Further, the generated order of the disassembly order can then be reversed 240 to thereby generate 245 an assembly order for the same product. In an optional step, in some implementations, a manufacturing bill of materials can then be generated 250 from the generated assembly order.

In some implementations, an assembly model used in a modeled disassembly of a product (such as described in FIG. 2) can be based on or otherwise associated with a pre-developed model of the product and its parts, such as a design-domain model developed using a CAD system. In some instances, a pre-developed model can be converted for use in connection with the interactive viewer used in the modeled disassembly described in connection with FIG. 2. The viewer can provide a simpler interface and function set than a CAD or DMU system, as the core functionality of the viewer is usually limited to providing simple viewing of assembly models and part models through a user interface, the user interface adapted to accept and recognize user selections of individual part models within the presented assembly model. The simpler viewing files used by the interactive viewer can allow for smaller, less complex files. The interactive viewer itself can provide advantages by permitting a less expensive manufacturing design application, with a simpler interface and function set. Indeed, typical CAD and DMU applications providing some measure of manufacturing sequence modeling are complicated applications providing a suite of features, most of which are attuned to and designed with the product design, rather than assembly, in mind. Additionally, by providing conversion of foreign product models, the interactive viewer can allow for wide compatibility with existing design domain tools. Indeed, a single interactive viewer tool can accommodate product model source data from multiple sources, including instances where a part model within an assembly model has been adapted or converted from a first format and the remaining assembly model converted from a second, different format. Such functionality can be particularly advantageous in allowing users of the viewer tool to mitigate against the need for migration from their typical CAD and DMU systems relied upon within the design domain in order to accommodate the requirements of the viewer and the manufacturing domain functionality it provides.

Further, in some implementations, data accessed by, used in connection with, and/or generated by an interactive viewer tool in connection with the modeling of a disassembly of a product and the generation of an assembly sequence for the product (such as described in FIG. 2), can interface with, be provided by, and/or maintained or stored in connection with an enterprise resource planning (ERP) system. Indeed, in some instances, the viewer tool can be directly integrated with or be provided as a service of the ERP system. Data maintained by the ERP, such as business data or an engineering bill of materials relating to a product, product part, or assembly process, can be used by the interactive viewer tool, for example, in connection with the presentation of a corresponding assembly model and the modeled disassembly of the product. As an example, data maintained by the ERP for a particular part in the modeled product can automatically populate fields of the viewer, be displayed, or otherwise made accessible to a user in response to the selection of the particular part in the interface of the viewer. For instance, the part name, manufacturer name, assembly instructions, safety instructions, supply chain information, cost information, and other information maintained by the ERP system for the product part can be provided or used in connection with modeling of the part in the interactive viewer. Indeed, the model of the part or product can be populated with business data maintained by the ERP system corresponding to the part or product. Similarly, business data maintained by the ERP system can automatically populate an assembly sequence generated for a product, including individual assembly operations or instructions specified for the assembly sequence. Additionally, data generated by the viewer for a particular product or product part, including assembly or disassembly sequences and instructions generated using the interactive viewer for the product or product parts can be integrated with data maintained by the ERP system. For instance, a manufacturing bill of materials (MBOM) generated from a modeled disassembly of a product can be stored and integrated with business data maintained by the ERP system, such as business data relating to contracts, purchasing, and supply of parts involved in the assembly, as well as business data relating to scheduling, workforce resources, and tooling used in connection with the product assembly.

Figure 3A:
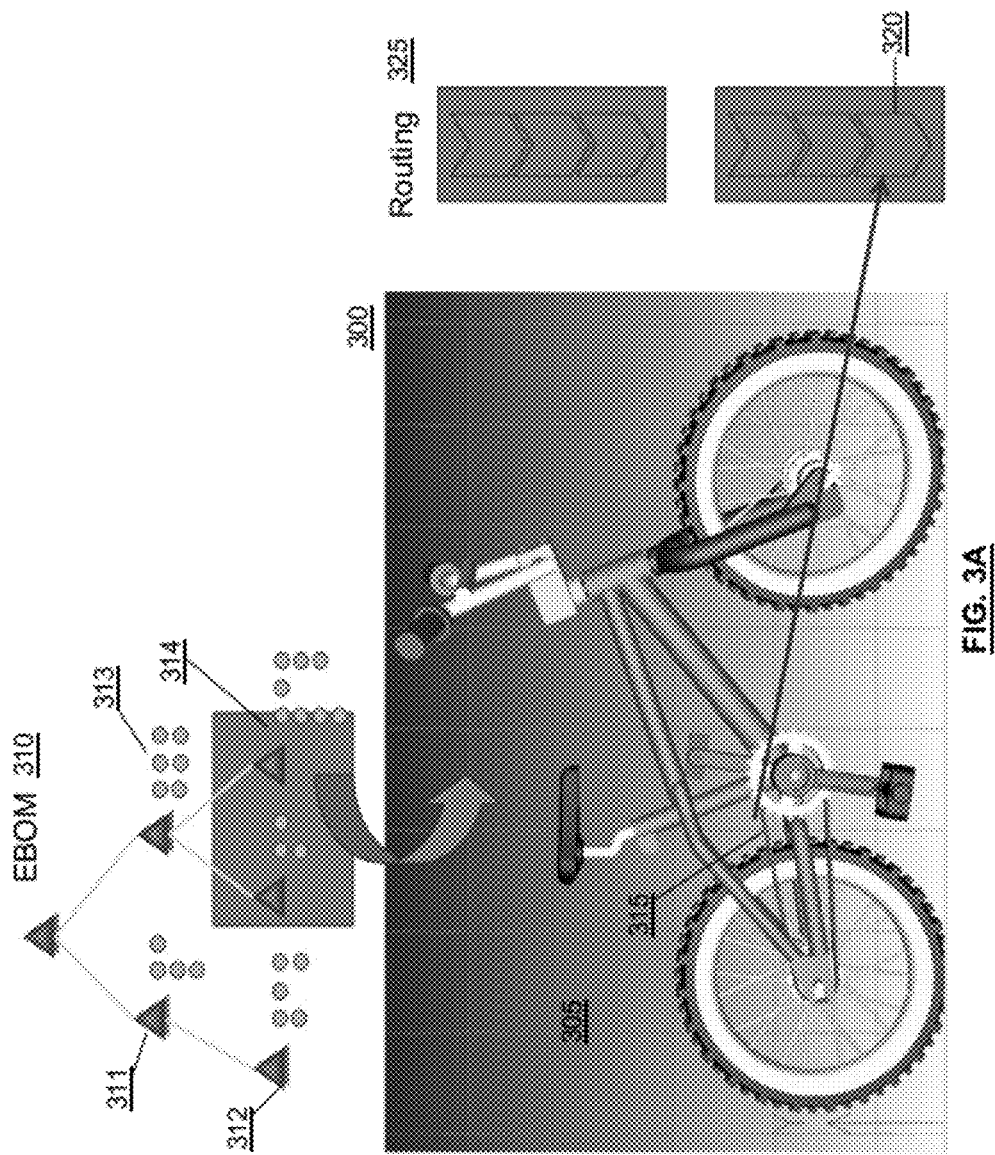

FIGS. 3A-3G illustrate an example viewing of a product assembly in an interactive viewer tool. As shown in FIG. 3A, a product assembly model 305, corresponding to a bicycle, can be viewed using an interface 300 of an interactive viewer tool. In some instances, the assembly model 305, as well as part models modeling the individual parts that make up the product, can be generated from, model, link to, or be otherwise associated with previously-generated and -defined product (and/or part) design and engineering data, including data maintained by an ERP system. For instance, an engineering bill of materials (EBOM) 310—previously developed by designers of the bike (and the parts composing the bike) or otherwise based on the preexisting bike design—can be referenced, input, or otherwise identified in connection with a visualization of the assembly model 305. The preexisting engineering and design data (e.g., 311-314) can include data corresponding to each of the parts composing the product assembly. For instance, part-specific engineering and design data can include part listings and part characteristic data included in an EBOM 310.

With a presentation of the assembly model 305 displayed to the user, one or more individual part models making up the assembly model 305 can be selected by a user through the interactive viewer's interface 300. The user selection can correspond to a particular part designated as the first part to be removed, detached, separated, or unfastened in a disassembly sequence of the product. In this manner, a user can use the interactive viewer tool to model disassembly of the corresponding product. For instance, in the particular example illustrated in FIGS. 3A-3G, it may be customary to remove or unfasten a bike chain as the first step in the repair or disassembly of a bicycle. Accordingly, as shown in FIG. 3A, a user selection of a part model 315 corresponding to a bike chain part can be selected. In response to the user selection of part model 315, the part (e.g., bike chain) can be associated with a first step in a disassembly sequence for the modeled bicycle. In some instances, the building of a disassembly order or process can be used to generate an assembly order for the same product assembly. For instance, the disassembly order can be generated and then reversed to generate an assembly order. In some instances, this "reversal" of steps can occur automatically and/or concurrently with the selection of a part model and the assignment of a corresponding part to a disassembly order. For instance, as shown in FIG. 3A, because the selected bike chain 315 has been designated as the first step in a disassembly process, the interactive viewer can automatically associate the bike chain with a final step 320 of an assembly order of the bike. Further, in some instances, the assembly order (built in reverse order) can be generated as a routing 325 adapted for, generated by, compatible with, or otherwise associated with and used by an ERP system.

Figure 3B:
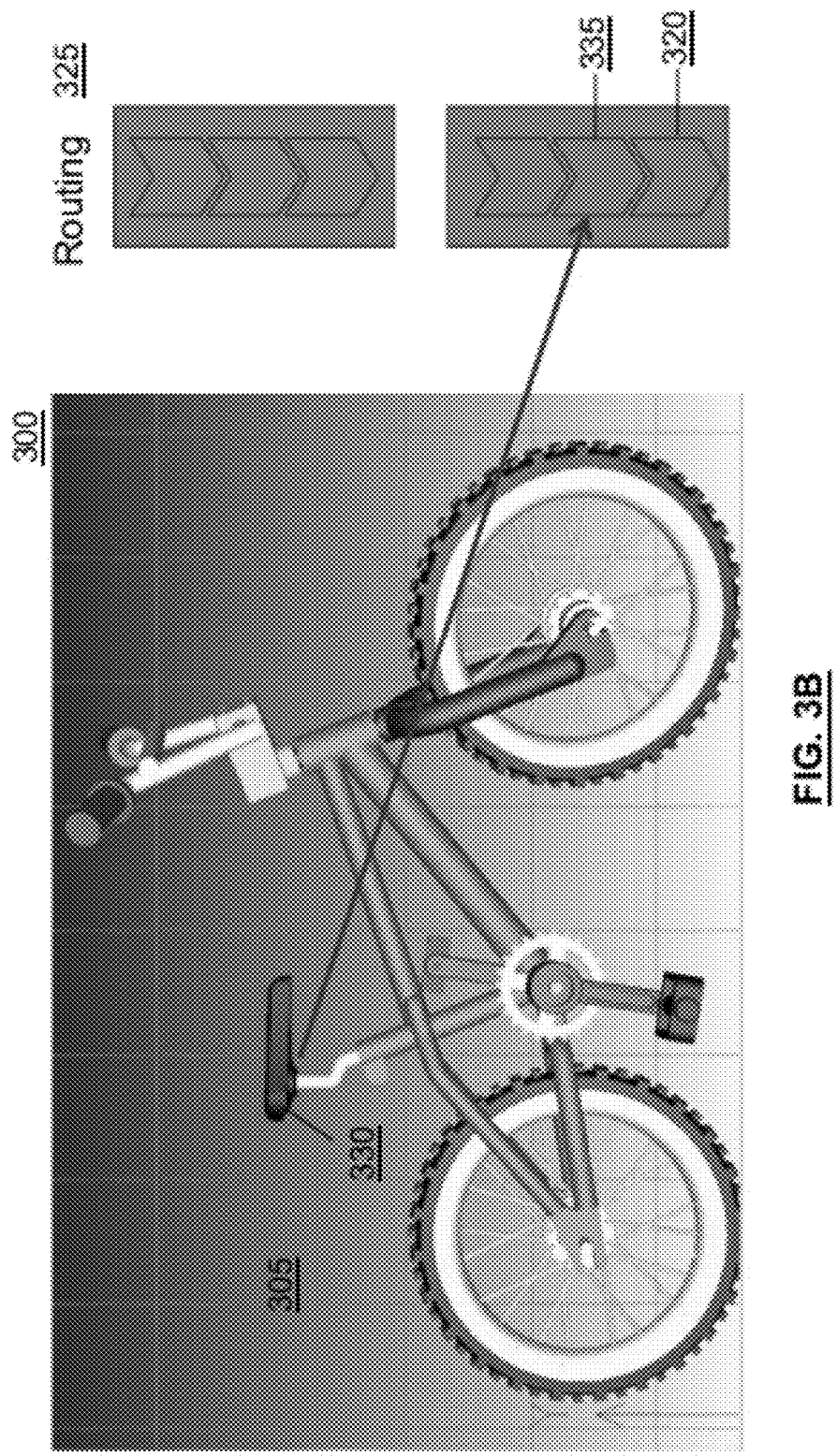

Upon selection of a first part model 315 corresponding to a first part to be removed from a product, the interactive viewer can represent removal of the bike chain in the assembly model by causing the bike chain part model 315 to disappear or be otherwise removed from the viewer interface 300, thus resulting in the presentation of the remaining assembly model 305, for example, as shown in FIG. 3B. As illustrated, FIG. 3B displays a modified representation of the assembly model 305 following the selection of the bike chain part 315, with the bike chain removed from the assembly model 305, to model how the bicycle might appear following the removal or unfastening of the bike chain. From the modified (partial) assembly model (missing the bike chain) in FIG. 3B, a user can select a second part model to designate the second part of the bicycle to be removed during disassembly of the bicycle. For instance, a seat part model 330 can be selected by the user, automatically assigned to the second disassembly step, as well as the second-to-last assembly step 335, and removed from the display 300 of the assembly model 305 (as shown in FIG. 3C, with both the seat and bike chain removed from the bicycle). This process can continue until each of the remaining part models making up the assembly model have been selected, assigned to disassembly and assembly steps, and removed from the interface 300, as shown in FIGS. 3C-3G.

Developing an assembly sequence and instructions for a product by modeling the product's disassembly can, in some instances, be more intuitive and more efficient than modeling the product's assembly directly (in forward order). In some instances, the complexity of assembling a product assembly from its constituent parts directly can be complex and difficult. Similar to assembling a puzzle or performing a calculation after having already seen it assembled or completed, modeling disassembly of an assembled product allows the user modeling the disassembly to see how the constituent parts of the product assembly fit together, thereby making it easier to appreciate how the product could be assembled. Additionally, in some instances, with the pieces shown in their assembled orientations, it can be more intuitive to select the next part that should be removed from a completed assembly rather than selecting the next part that should be added during assembly of a product from a group of parts, particularly where subsequent assembly steps are strongly dependent on previous assembly steps (e.g., bicycle gears can be required to be mounted before the bike chain, pedals, and crank arm, etc.). Furthermore, efficiencies can be realized by working backward in developing an assembly order, such as shown and described in FIGS. 3A-3G. For instance, as shown in FIG. 3A, the product assembly model can be based on pre-existing data and models developed in connection with the design and engineering of the product itself. In many instances, engineering and design data can consider how various parts fit together in a completed product. Often, however, design data and considerations are divorced from the precise needs and processes within the product manufacturing domain, as the domain is focused on developing a finished product (and not managing the idiosyncrasies, events, pitfalls, and considerations of the manufacturing domain as assembly of the product is fine-tuned). The existence of ready-made product models within the design domain can be exploited, however, in connection with the development of an assembly sequence from a reversed disassembly order generated by modeling disassembly of a fully-assembled product model. For instance, by converting a fully-assembled design model of a product into an assembled assembly model of the product, efficiencies can be realized by using the existing, assembled design and avoiding the step of deconstructing the design model into its constituent parts for later use in modeling the assembly of the product assembly within the context of the manufacturing or assembly domain.

Figure 3D:
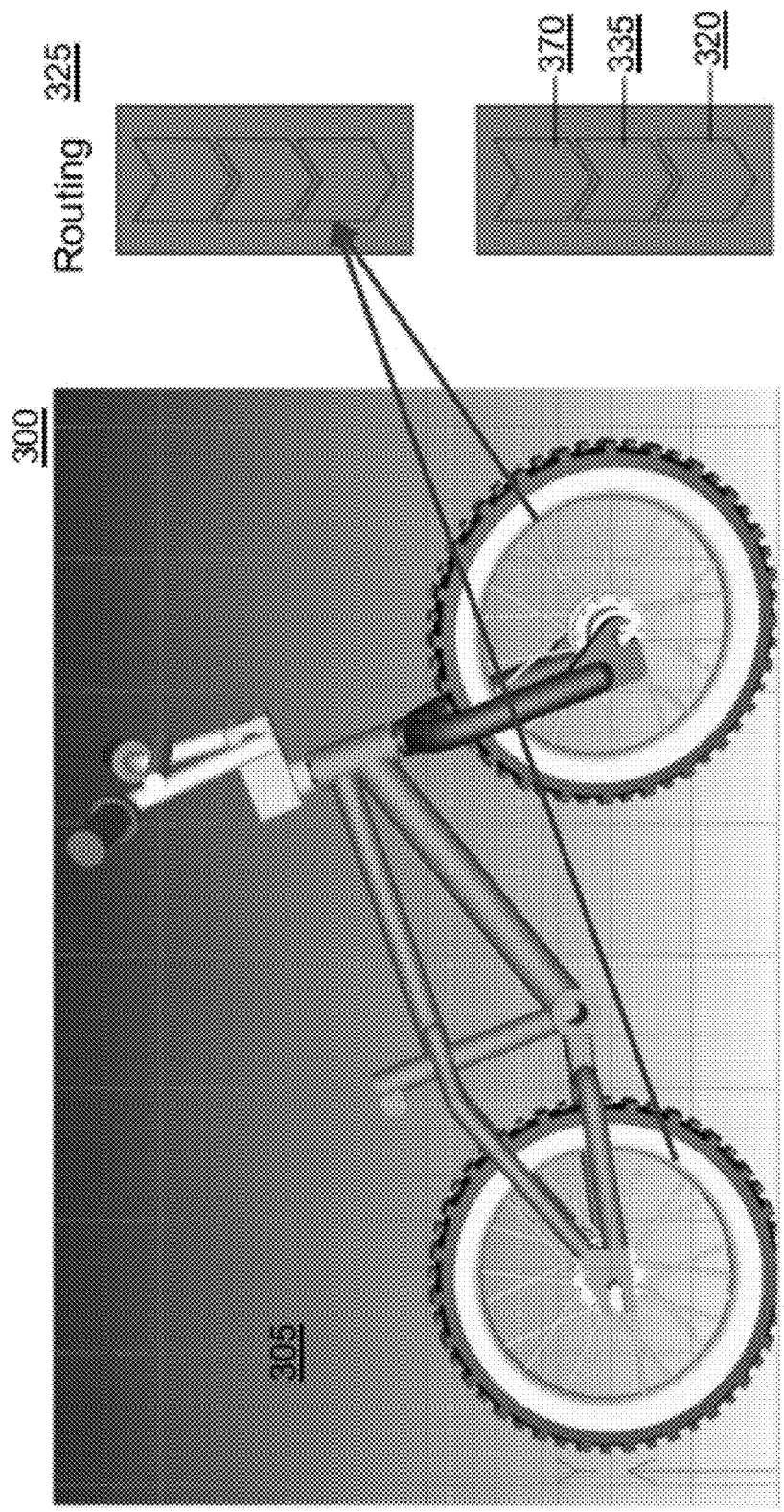
Figure 3E:
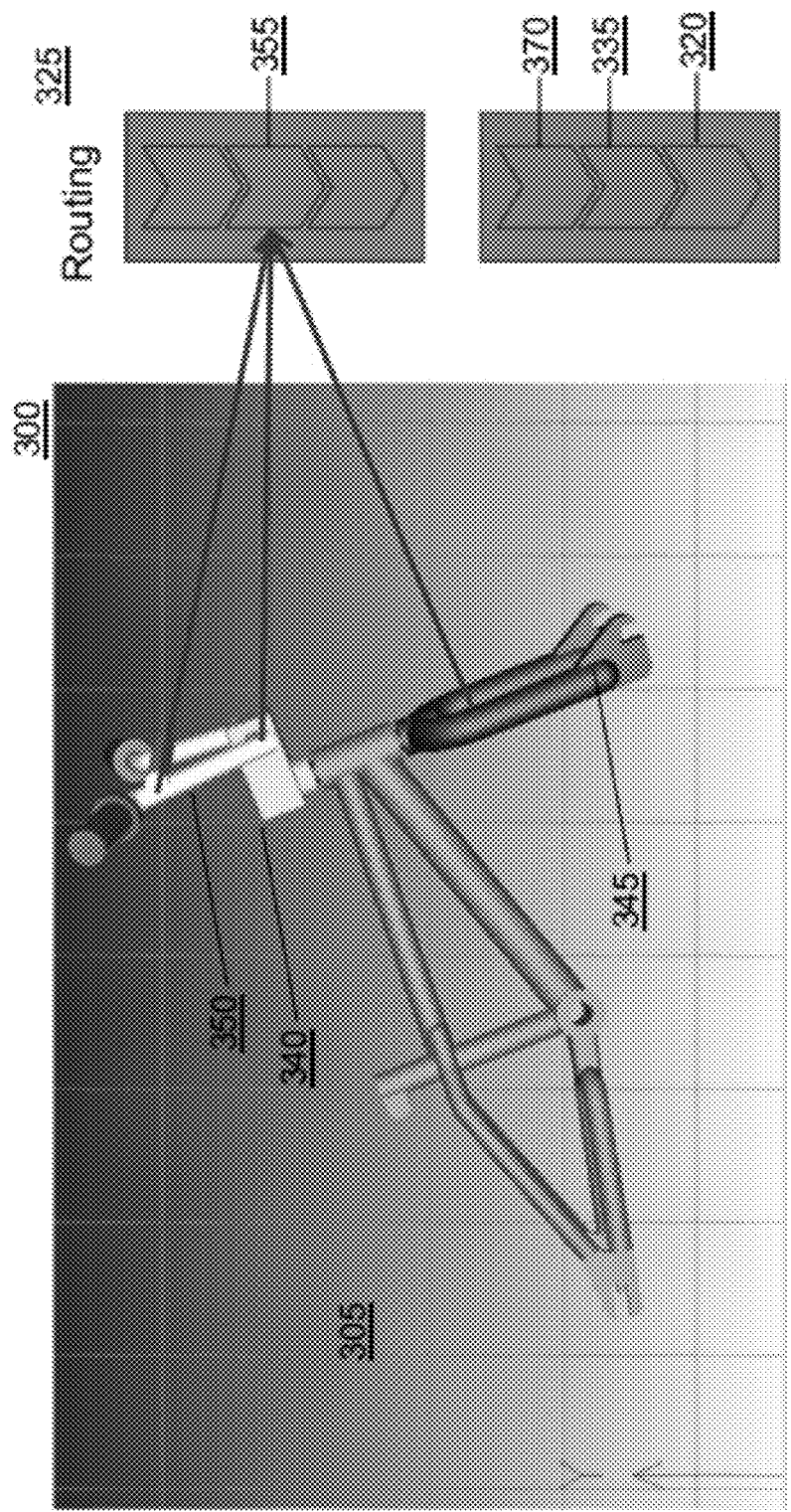
Figure 3F:
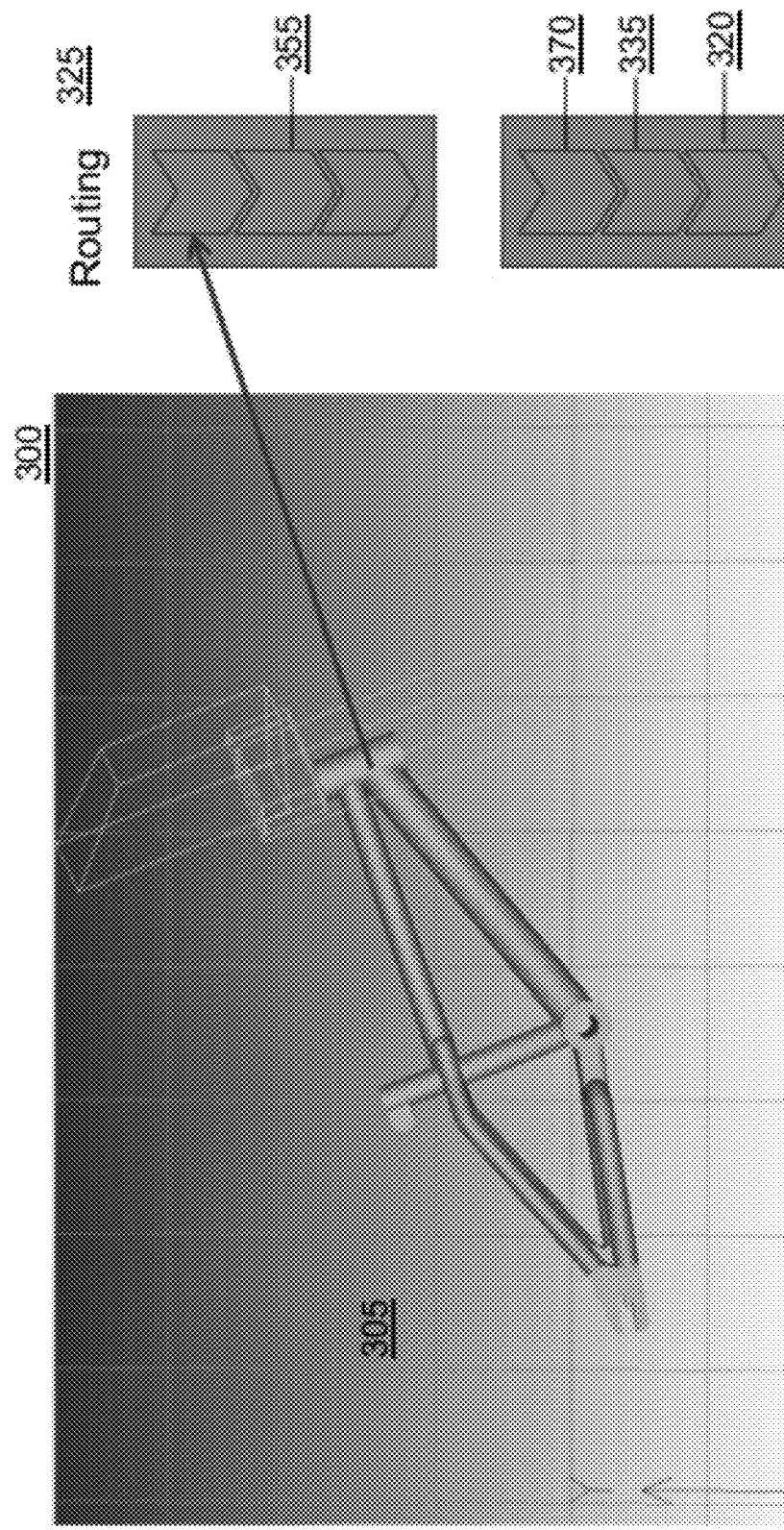

As shown in FIGS. 3C-3E, in some instances, more than one part model can be selected and associated with a particular disassembly step. The disassembly (and assembly) of some parts in a product assembly may be closely related with or dependent on the disassembly or assembly of other parts in the product. Indeed, despite the assumptions of the product designers, in some instances, multiple parts shown as separate and distinct within an assembly model, may in actuality be members of a common subassembly that can be installed or joined to the remaining products in a single or simplified step(s). As a consequence, it may be desirable to group certain parts together in connection with a particular assembly step. For instance, as shown in FIG. 3E, unfastening the stem 340, can result in the loosening and quick removal of the fork 345 and handlebars 350 as well. In other instances, associating more than one part with a single disassembly step (e.g., 355) can also serve to model the plurality of selected parts as a single part or sub-assembly. While two or more particular part models, presented together with the assembly model 305, may be each individually selectable, such as gears 360 and pedals 365 (in FIG. 3C), the real-world parts may be a single part or subassembly. Selecting the parts included in the subassembly and associating them with a single disassembly step 370 can serve to designate the part models as parts of a single subassembly, such as shown in FIG. 3C.

In some implementations, selection and removal of particular part models from an assembly model can include additional inputs, functionality, and interactive features. For instance, in some examples, a user can roughly model how a particular part would be removed from a product by clicking on the part model and dragging the part model away from the remaining assembly model in a direction or along a path approximating the path the real world part would travel if removed in a similar manner from the corresponding product. As an example, returning to FIG. 3E, removal of the handlebars 350 could be carried about by lifting the handlebars upward relative the rest of the remaining bicycle. Accordingly, a user in this particular example could indicate disassembly and removal of the handlebars by clicking on handlebar part model 350 and dragging handlebar part model 350 upward and in a direction roughly parallel to the interfacing stem 340 to which the handlebars are directly connected.

When a part is removed according to a particular direction or path, the user input of dragging the part model away from the assembly model along a particular path can be recorded for use in disassembly instructions generated from the modeled disassembly, including a multimedia playback of the modeled disassembly to a user. Additionally, the recorded disassembly path for a particular part can be reversed for use in an assembly process or assembly sequence generated by reversing disassembly steps specified during the modeled disassembly of the product. For instance, returning to the example of the removal of the handlebars, the interactive viewer application can recognize the coordinates of a user's removal of the handlebars and determine a path and/or coordinates opposite the direction of removal that potentially correlates with a direction of attaching or assembling the handlebars of the headset 340 to the bike (i.e., downward onto the stem). Implementations permitting three-dimensional viewing of the assembly model can be particularly suited to providing and recording directional removal of parts during a modeled disassembly of a product. For instance, some parts may be removed in a direction orthogonal to a user's current field of view (e.g., such as the removal of pedal models 365 in the view provided by FIG. 3C). By rotating the view of the assembly model, a view of the model can be obtained that allows for modeling of the direction of disassembly (and assembly) of a part. Additionally, the attributes of the view from which a disassembly path was defined can also be recorded and associated with the removal of a particular part during a modeled disassembly of a product.

In some implementations, a displayable part model, such as the plurality of part models shown in FIGS. 3A-3G, can each have associated spatial location data. Spatial location data can specify the default position of each part model. In 3D models, spatial location data can specify the part model's position in three-dimensional coordinates. In some instances, spatial location data can be specify a part's relative position, that is, the position of the part model relative one or more other part models. A "parent" part or assembly can be defined and a child part's location defined relative to the parent part. As discussed, part models can be converted from more complex CAD model data. In some implementations, CAD models inherently include spatial location data, although this spatial location data is embedded in the CAD model data. Generation of a part model for use in a simplified viewer application, such as described herein, can include isolating or separating the spatial location data of the CAD model from the remainder of the CAD model data and maintaining the spatial location as a file separate from the generated viewer-adapted part model. Maintaining separate spatial location data can be of use, for example, in reorganizing and grouping parts into subassemblies, enabling path-defined part removal procedures (as explained above), and other location-based functionality, as the part model can be temporarily disassociated from its corresponding spatial location data, while preserving an association to the part's default location data.

Figure 3G:
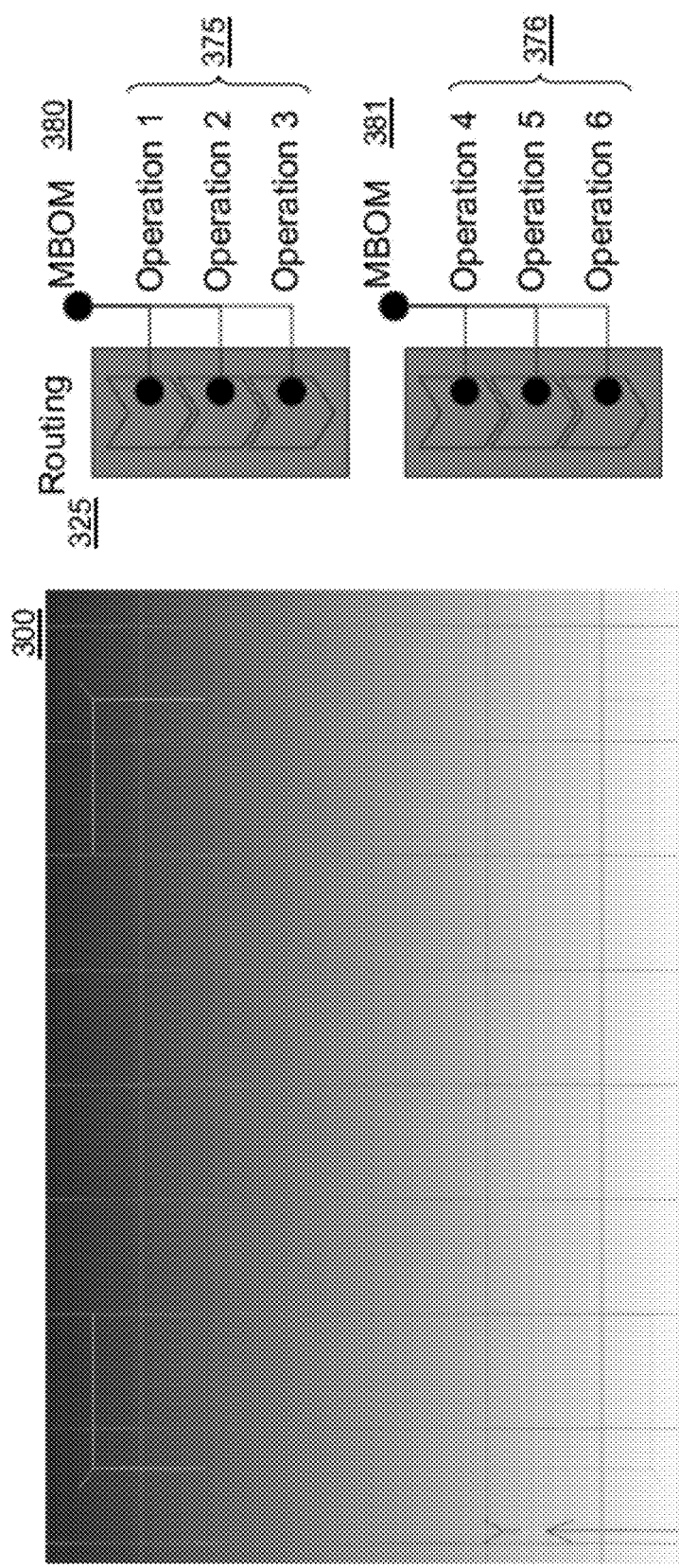

As shown in FIG. 3G, in some instances, when all of the part models in an assembly model have been selected by a user, and removed from the viewer interface, an empty user interface is displayed, indicating that all of the parts have been assigned to a disassembly step. Further, as shown in FIG. 3G, selecting a part model can assign a corresponding part within a particular disassembly (and assembly) sequence. In some instances, a user can supplement the selection of a part with a description of operations, tools, logistics, part information, safety information, part- or product-related business data, and other manufacturing data 375, 376 describing or relating to the disassembly or assembly of the part from the product assembly. Supplemental manufacturing data 375, 376 can be added before, substantially concurrent with, or after the selection of a particular part model during a modeled disassembly of a product. Indeed, in some instances, a user can add supplemental manufacturing data after a plurality of or all of the parts have been selected during modeled disassembly of a product. Further, manufacturing data can be added after a generated disassembly order has been reversed to generate an assembly order routing 325. Manufacturing data can include instructions corresponding to an assembly step, tools needed for one or more assembly steps, personnel needed for one or more assembly steps, the time to complete a particular assembly step, costs associated with the step, the name of the actual parts used, logistical data relating to the actual part (e.g., supply chain data, cost data, shipping data, as well as other material maintained for manufacturing components within the context of an ERP system), plant location, and other information relating to the assembly or disassembly of a particular product.

In some instances, as shown in FIG. 3G, a generated assembly operation order, as well as manufacturing data 375, 376, can be used to automatically generate a manufacturing bill of materials (MBOM) 380, 381. In instances where models and data associated with an EBOM are used in the modeling of a product disassembly and generation of a product assembly order, an MBOM can be generated from and be based, at least in part, on the EBOM generated within the design domain of the product. Further, multiple MBOMs (e.g., 380, 381) can be generated, in some instances, from a single disassembly modeling, for instance, with separate MBOMs corresponding to subassemblies of the larger product modeled by the assembly model. MBOMs generated from a modeled disassembly using an interactive viewer tool are integrated with other business data maintained by an ERP system associated with the viewer tool.

Figure 4:
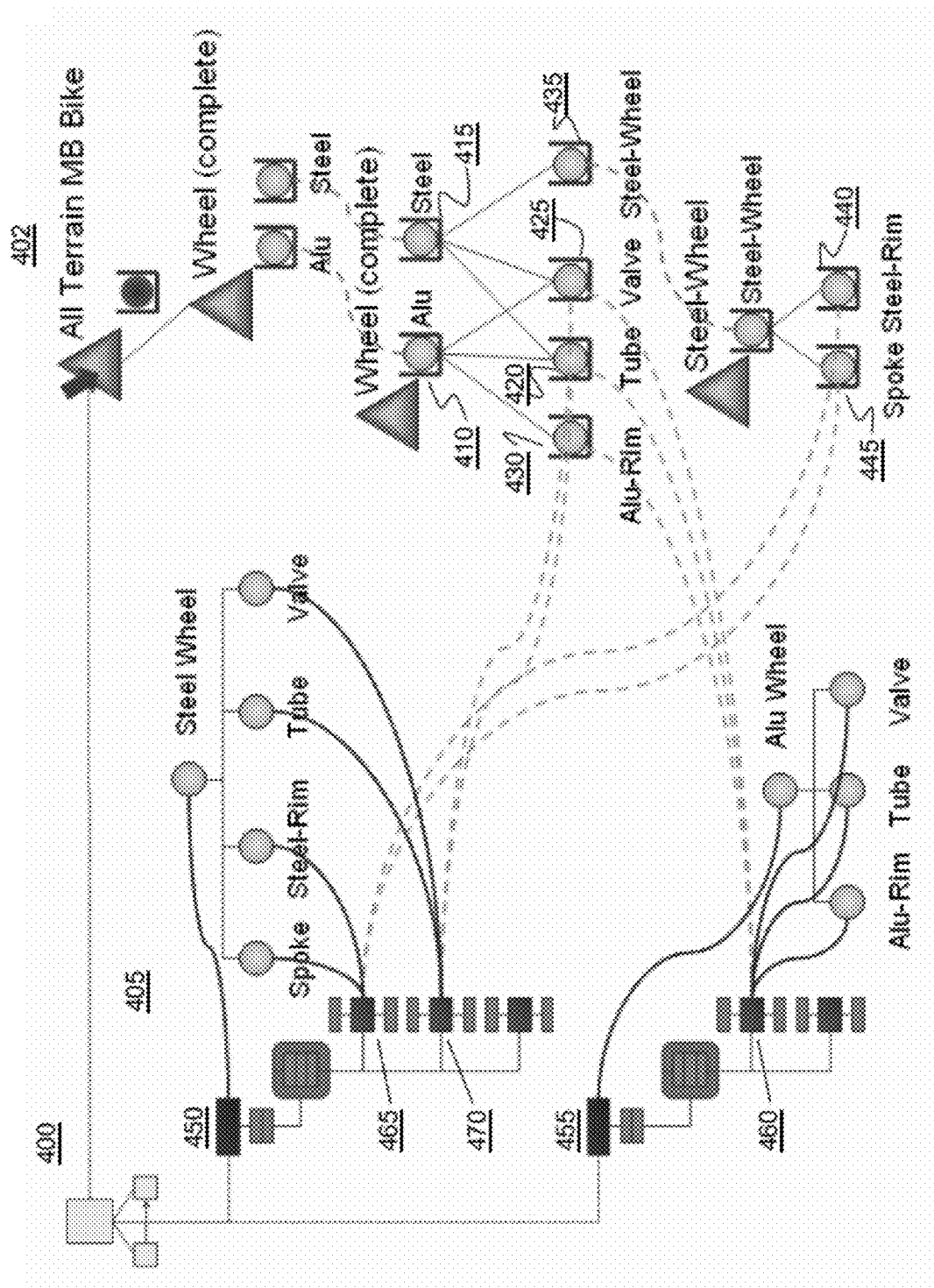
FIG. 4 is a diagram representing an example engineering bill of materials used in connection with an interactive viewer tool.

FIG. 4 illustrates an example product structure tree 400 showing a relationship between a previously-generated EBOM 402 used in connection with an assembly model, modeled within an interactive viewer, and an MBOM 405 generated based, at least in part, on the results of a simulated disassembly of the assembly model using the interactive viewer. The example product represented by the product structure tree 400 (and EBOM 402 and MBOM 405) in FIG. 4 again pertains to the simple example of a bicycle, in this case an all-terrain mountain bike. In some examples, there may be more than one variant of a particular product including at least one part different between the two product variants. Variants can include instances where two alternative part types, such as parts manufactured and supplied by different vendors are considered or used in instances of a product being modeled by an interactive viewer application. Additionally, variants of a particular product may also include at least one common part or overlapping sets of parts. In instances where parts overlap, data and models associated with the overlapping parts can be reused across variants.

In the example EBOM 402 represented in FIG. 4 for a mountain bike, at least two variants can be identified based on at least two alternate bicycle wheel part options, namely a steel bicycle wheel 415 and an aluminum bicycle wheel 410, represented by the diverging branches in the product structure tree 400. As illustrated in product structure tree 400, while a bicycle wheel is typically regarded as a single part in the overall structure of a bike, both the steel 415 and aluminum 410 wheels can also each be regarded as a separate subassembly featuring a plurality of their own constituent parts.

Indeed, as shown in FIG. 4, some overlap exists between the constituent parts of the steel 415 and aluminum 410 wheel options. For instance, each of the steel 415 and aluminum 410 bicycle wheels can include an inner tube 420 and valve 425. However, the difference between the two subassemblies, in this example, are the respective rims 430, 435, one 430 made of aluminum and the other 435 of steel. However, while, in this instance the aluminum rim 430 is a molded implementation with integrated spokes, thus comprising a single unitary piece, the steel rim 435 includes the rim base 440 and spokes 445 as separate elements. This distinction, while shown as also recognized in EBOM 402, can, in some implementations, be defined at the manufacturing domain level, as the distinction between spokes that come included with a rim (e.g., 430) and spokes that must be connected to a rim (e.g., 435) can be quite meaningful from the manufacturing perspective. Indeed, in an implementation of an interactive viewer modeling disassembly of the wheel, the spokes, generally, can be represented as one or more parts distinct from the rim portion of the wheel, including in a sub-assembly model of the aluminum wheel. The user can identify that the particular aluminum wheel used in the assembly does not require manufacturing steps relating to the spokes and can thus select the rim and spokes as a group and specify that the rim and spokes are removed as a unitary entity (e.g., 430). On the other hand, a user modeling the disassembly of the steel wheel variant may select the steel rim base 440 and spokes 445 separately when modeling disassembly and designate separate assembly operations to each sub-part.

Allowing efficient and easy modeling of product assembly variants can be important as variations between parts or subassemblies can result in meaningful deviations within the manufacturing domain (and in the corresponding MBOM). For instance, as shown in the example MBOM 405, an assembly routing 455 for the aluminum wheel subassembly 415 varies from routing 450 of the subassembly corresponding to the steel wheel 415 variant, as the entire aluminum wheel is assembled in a single operation 460, in this particular example, while assembly of the steel wheel takes place in at least two operations 465, 470. The example of bicycle wheels, illustrated in FIG. 4, is but one simplified example, and other diverse examples and scenarios exist. In any event, in some instances, an interactive viewer tool can be used to generate assembly orders and MBOMs, including assembly sequences for subassemblies and subassembly variants. Additionally, an interactive viewer tool can use and associate data from the design domain, including EBOMs, to assist in developing assembly models, manufacturing and assembly instructions, MBOMs, and other data and models for the manufacturing domain. For instance, as shown in FIG. 4, parts identified in the design domain within an EBOM for a particular part (e.g., 402) can be linked, associated with, or used to supplement manufacturing level data generated using the assembly modeling capabilities of the interactive viewer (e.g., MBOM 405).

As discussed in some detail in connection with the example of FIG. 4, assembly and manufacturing sequences and instructions generated for a product assembly using an interactive viewer application, can include sub-assemblies, part variants, as well as hierarchical relationships structures, such as the product structure tree 400 shown in FIG. 4. Such implementations can further allow for the reuse of portions of previously generated manufacturing instruction data for portions of a product that overlap with another variant of the product. Returning to the example of the mountain bike of FIG. 4, in one particular example, the components of two distinct mountain bike products can be substantially identical with the exception of the wheels used; one using aluminum, the other steel. In such an example, much of the manufacturing data generated for the first, aluminum-wheeled bike could be used in manufacturing data associated with or generated for the second, steel-wheeled bike. Indeed, generation of manufacturing data for the latter of the two bicycle designs modeled could merely require editing a previously-generated manufacturing sequence and instructions for the earlier-analyzed design to account for the differences in the parts or subassemblies that are not common between the product variants.

Figure 5:
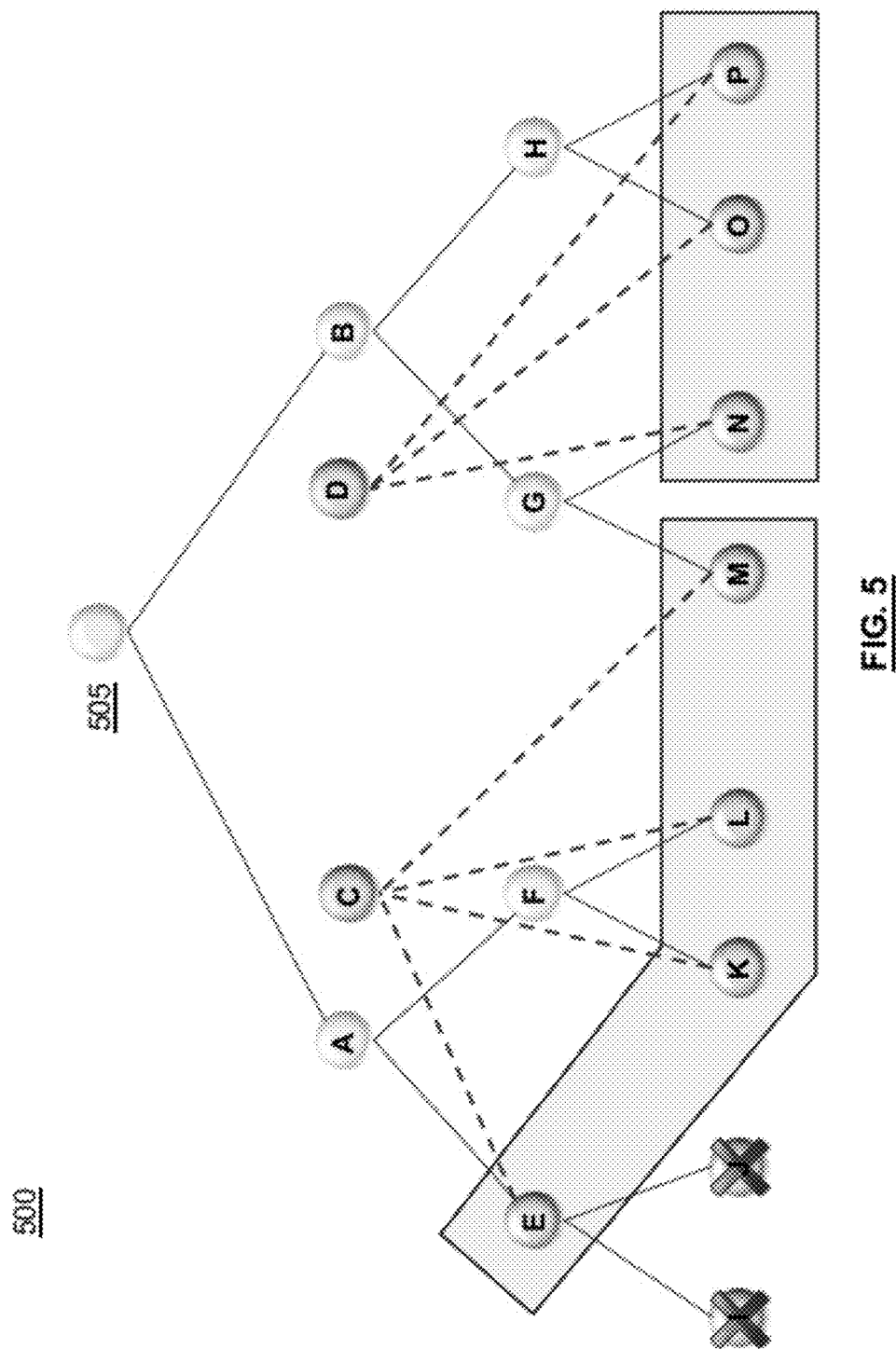
FIG. 5 is a diagram representing an example product structure tree corresponding to a manufacturing bill of materials.

As an example of the above, as shown in the product structure tree 500 of FIG. 5, a particular product 505 can include, in a first embodiment, subassemblies A and B. Subassembly A, in the first embodiment, can include parts E, F, I, J, K, and L. Subassembly B can include parts G, H, M, N, O, and P. Subassemblies A and B can be defined by the dependencies between sub-parts (e.g., parts E-P) of the respective subassemblies (e.g., A and B). Indeed, in some instances, a subassembly can be, for all intents and purposes, a single part composed of, what in other instances would be considered separate parts. Indeed, in some instances, the structure or characteristics of a subassembly, as assumed within the design domain, can differ from the actual structure or characteristics of the subassembly encountered within the manufacturing or process domain. For instance, FIG. 5 shows an example of the effect of replacing subassemblies A and B (e.g., in an engineering or design domain product structure) with subassemblies C and D (e.g., in the actual product structure encountered in the manufacturing domain). While an assembly model can be converted from design data that anticipated subassemblies implemented as subassemblies A and B, manufacturing realities may dictate assembly using subassemblies C and D. Accordingly, a user can revise the design-domain assumptions using the viewer to specify the realities of the manufacturing domain by collectively selecting those individual parts that correspond to subassemblies C and D. As shown in FIG. 5, the distinctions between design domain assumptions and manufacturing domain realities can be substantial as, in this example, part M belongs to an entirely different subassembly in the manufacturing product structure as compared with the engineering product structure, and parts I and J are entirely absent or integrated in another part in the manufacturing product structure (i.e., in part E) and need not be considered in the manufacturing assembly (e.g., part E is received fully assembled to include I and J, etc.). Such rearrangement and substitution of parts necessitated by the transition from the engineering product structure to the manufacturing product structure, can be easily supported by the interactive viewer.

Figure 6:
FIG. 6 illustrates an example screenshot of a user interface of an interactive viewer tool.

FIG. 6 illustrates an example screenshot 600 of a user interface of an interactive viewer tool adapted to model disassembly of a product and generate an assembly order for the product based on the modeled disassembly of the product. FIG. 6A illustrates a first example screenshot 600, showing a viewing pane 605 that includes the representation of a particular assembly model 610. The viewing pane 605 allows for viewing of three-dimensional assembly models, allowing users to turn, zoom, and rotate views of a particular assembly model and its respective part models. In the particular implementation shown in FIG. 6A, a user can further use a menu 615 to select what portion of the overall product, will be presented in the viewing pane 605 as an assembly model. The portion designated for modeling in the viewer can be selected by the user, for instance, on a part-by-part basis. For example, a user can check or uncheck particular parts to indicate which parts of the product should be represented in the viewing pane 605. The part menu 615 can be used, for instance, to limit viewing and disassembly modeling of the product to a particular subassembly. Additionally, the parts listed within part menu 615 can be represented hierarchically, for example, in a form at least approximating a product structure tree, to assist the user in appreciating known relationships and dependencies between parts in the product. Indeed, part listings presented in part menu 615 can include at least some parts, hierarchical relationships, and other data from the product design domain, such as an EBOM relating to the product modeled by assembly model 610.

Additional menus and windows can also be provided in connection with the interactive viewer interface shown in FIG. 6. For instance, a window 620 can be provided outlining the development of an assembly (or disassembly) routing developed through modeling disassembly of the assembly model 610. Additionally, a user can edit aspects of a generated assembly sequence or routing using window 625. Further, additional data can be entered and associated with parts selected from the assembly model and steps in the routing. For instance, particular assembly operations can be defined or identified corresponding to a selected part or assembly step. Additionally, a window 625 can be provided defining attributes of particular assembly operations corresponding to the real world assembly of the product and subassemblies modeled by the assembly model 610. In some examples, data entered and defined in connection with assembly and disassembly operations in window 625 can be linked to or otherwise associated with routing steps defined and outlined through window 620. Window 630 can show assignments of parts in the product structure (shown in window 615) to steps in the assembly sequence (represented by the routing structure in window 620). In some examples, user selection of parts (listed for example in window 615) or operations (listed for example in window 620) can highlight a corresponding operation or part in another window (e.g., 620, 615), including viewing pane 605, to assist the user in visualizing and tracking associations between parts and operations assigned to the parts. Other interfaces, windows, menus, features, and layouts can also be implemented in connection with various implementations of a graphical user interface for an interactive viewer adapted to model disassembly of a product and generate an assembly order for the product based on the modeled disassembly, including features not shown in FIG. 6.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

What is claimed is:

1. A computer-implemented method comprising:
identifying a model of an assembly, using an interactive viewer system including at least one computing device, the assembly including a plurality of parts, the model including a plurality of distinct part models, wherein each part model in the plurality of part models is a predefined, selectable part model corresponding to at least one part in the plurality of parts;
displaying a presentation of the modeled assembly in a user interface of the interactive viewer system;
receiving, through the user interface, a sequence of user selections, each user selection in the sequence of user selections identifying a particular part model in the plurality of part models, wherein user selection of a particular part model corresponds to a designation of a corresponding part in the plurality of parts to be removed from the assembly during a disassembly of the assembly, wherein each selected part model is removed from the displayed presentation in response to the corresponding user selection;
generating, using the interactive viewer system, a disassembly order including an ordered grouping of disassembly steps, each disassembly step in the grouping of disassembly steps corresponding to a user selection in the sequence of user selections, wherein the grouping of disassembly steps is ordered based on an order of selection of the corresponding part model by a user; and
reversing the order of the disassembly order using the interactive viewer system; and
generating an assembly order for the assembly from the reversed disassembly order using the interactive viewer system.

2. The method of claim 1 further comprising storing the generated assembly order as a routing in an enterprise resource planning (ERP) system.

3. The method of claim 2, wherein generating an assembly order for the assembly is performed by the ERP system.

4. The method of claim 2 further comprising:
receiving preexisting data from the ERP system corresponding to at least one part in the plurality of parts; and
associating the preexisting data corresponding to a particular part with a particular part model in the plurality of part models corresponding to the particular part.

5. The method of claim 4, wherein the preexisting data includes at least a portion of a first bill of materials associated with the assembly.

6. The method of claim 5 further comprising generating a manufacturing bill of materials based at least in part on the portion of the first bill of materials and the generated assembly order.

7. The method of claim 1 further comprising generating a manufacturing bill of materials based at least in part on the generated assembly order.

8. The method of claim 1 further comprising associating manufacturing data with at least a portion of user selections in the sequence of user selections.

9. The method of claim 8, wherein manufacturing data is specified by a user.

10. The method of claim 8, wherein manufacturing data includes at least one assembly instruction.

11. The method of claim 1, wherein receiving a sequence of user selections includes:
receiving a first user selection of at least one first part model in the plurality of part models, the first user selection identifying a first part in the plurality of parts to be removed from the assembly during a disassembly of the assembly,
removing the first part model from the displayed presentation of the modeled assembly to display a first modified presentation of the modeled assembly in the user interface in response to the first user selection,
receiving a second user selection of a second part model included in the first modified presentation, the second user selection identifying at least one second part in the plurality of parts to be removed from the assembly, after removal of the first part and during the disassembly of the assembly; and removing the second part model from the displayed presentation of the modeled assembly to display a second modified presentation of the modeled assembly in the user interface in response to the second user selection.

12. The method of claim 1, wherein receiving a particular user selection in the sequence of user selections includes:
selecting a particular part model from at least a portion of the model of the assembly including the particular part model, the particular part model corresponding to a particular part in the plurality of parts;
dragging the particular part model along a path leading away from the portion of the assembly model, the path representing an approximate direction of displacement of a particular part from the assembly during disassembly of the assembly.

13. The method of claim 1, wherein the model of the assembly is a model of a subassembly of the assembly, the subassembly including less than all of the parts of the assembly.

14. A system comprising:
an enterprise resource planning system including:
at least one processor adapted to execute a plurality of business applications, and
at least one memory device served by the enterprise resource planning system, the memory device storing business data used by the plurality of business applications;
a viewer tool, integrated with the enterprise resource planning system and adapted to:
identify a model of an assembly, the assembly including a plurality of parts, the model including a plurality of distinct part models, wherein each part model in the plurality of part models is a predefined, selectable part model corresponding to at least one part in the plurality of parts;
display a presentation of the modeled assembly in a user interface of a viewer application;
receive, through the user interface, a sequence of user selections, each user selection in the sequence of user selections identifying a particular part model in the plurality of part models, wherein user selection of a particular part model corresponds to a designation of a corresponding part in the plurality of parts to be removed from the assembly during a disassembly of the assembly, wherein each selected part model is removed from the displayed presentation in response to the corresponding user selection;
generate a disassembly order including an ordered grouping of disassembly steps, each disassembly step in the grouping of disassembly steps corresponding to a user selection in the sequence of user selections, wherein the grouping of disassembly steps is ordered based on an order of selection of the corresponding part model by a user; and
reverse the order of the disassembly order to generate an assembly order for the assembly.

15. The system of claim 14, further comprising a CAD system distinct from the viewer tool and adapted to provide product design functionality.

16. The system of claim 15, wherein the model of the assembly includes data converted from 3D CAD model generated using the CAD system.

17. The system of claim 14, wherein the business data includes data associated with an engineering bill of materials.

18. The system of claim 14, wherein the business data includes data associated with the generated assembly order.

19. The system of claim 14, wherein the viewer tool is further adapted to present a plurality of views of a 3D version of the model of the assembly.

20. An article comprising a non-transitory, machine-readable storage device storing instructions operable to cause at least one processor to perform operations comprising:
identifying a model of an assembly, the assembly including a plurality of parts, the model including a plurality of distinct part models, wherein each part model in the plurality of part models is a predefined, selectable part model corresponding to at least one part in the plurality of parts;
displaying a presentation of the modeled assembly in a user interface of a viewer application;
receiving, through the user interface, a sequence of user selections, each user selection in the sequence of user selections identifying a particular part model in the plurality of part models, wherein user selection of a particular part model corresponds to a designation of a corresponding part in the plurality of parts to be removed from the assembly during a disassembly of the assembly, wherein each selected part model is removed from the displayed presentation in response to the corresponding user selection;
generating a disassembly order including an ordered grouping of disassembly; and steps, each disassembly step in the grouping of disassembly steps corresponding to a user selection in the sequence of user selections, wherein the grouping of disassembly steps is ordered based on an order of selection of the corresponding part model by a user.

21. The article of claim 20, wherein the operations further comprise reversing the order of the disassembly order to generate an assembly order for the assembly.

* * * * *